United States Patent [19]

Kittelson

[11] Patent Number: 4,644,244

[45] Date of Patent: Feb. 17, 1987

[54] BATTERY CONDITIONER

[76] Inventor: Clifford E. Kittelson, Rte. 3, Box 130, Watertown, S. Dak. 57201

[21] Appl. No.: 771,415

[22] Filed: Aug. 30, 1985

[51] Int. Cl.⁴ .............................................. H02J 7/00
[52] U.S. Cl. ......................................... 320/4; 320/2; 320/3; 429/100; 429/96
[58] Field of Search ................... 320/3, 4, 5; 429/100, 429/96

[56] References Cited

U.S. PATENT DOCUMENTS 2,982,807 10/1957 Dassow et al. ...................... 429/100
3,414,793 12/1968 Jasperson ................................ 320/5

Primary Examiner—Peter S. Wong
Assistant Examiner—Mark D. Simpson
Attorney, Agent, or Firm—Palmatier & Sjoquist

[57] ABSTRACT

A depolarizing device conditioning for small batteries includes an open ended housing for receiving and holding a large battery to be used as a source of depolarizing current, a carrier, for receiving a small battery to be depolarized, configured to be slidably received in the open end of the housing and a cover to be placed over the end of the housing and the holder. A contact assembly includes a spring connecting one end of the large battery to a conductive member extending over the open end of the housing and a cooperating conductive member extending across the interior of the cover and terminating at the open end of the cover, the ends of the conductive members are configured to releasably, lockably interact so as to retain the small battery in conductive, conditioning relationship with the large battery.

8 Claims, 4 Drawing Figures

BATTERY CONDITIONER

BACKGROUND OF THE INVENTION

1. Field of the Invention

This invention relates to the conditioning of small electrical cells of the type that are used in hearing aids, cameras and other electronic instruments.

2. The Description of the Prior Art

Typical summaries of the prior art with which this application is concerned may be seen in U.S. Pat. No. 4,282,474 for LIFE-PROLONGING DEVICE FOR HEARING AID BATTERIES and U.S. Pat. No. 4,352,052 for adaptor for charging small cells in large-cells charger. In these prior art patents and from other sources it may be determined that the small batteries, sometimes referred to as "button" batteries used in hearing aids and other electronic instruments are capable of providing substantially longer service than is normally encountered in situations wherein the battery is continuously used until the instrument no longer works. In other words, a typical battery is constructed of an exterior case having a positive and negative terminal and an interior containing a chemical extending between the terminals. In the course of supplying current to the instrument in which the battery is used, the chemical reaction results in a polarized coating on one or the other or both of the terminals interiorly of the battery and this coating, known as polarization, presents an impediment toward the flow of current and to the chemical reaction necessary to generate the electrical energy so that, even though the chemicals and electrodes are present and are not exhausted, the reaction that is necessary to the generation of electrical energy ceases. In order to, in effect, renew or "recharge" the battery, it is necessary to condition the battery by applying a reverse flow of current through the battery to be restored and, when this is accomplished, the flow of current through the battery results in a depolarization to remove the barrier or impediment to further operation as a source of electrical energy.

In one of the prior art patents referred to above, an adapter is provided for permitting a small battery to be used in a battery charger, or source of current, that will only handle large batteries such as the familiar AA, C or D cells. In the other of the patents referred to above a housing is provided in which an actual battery, such as a C or D battery, is disposed to provide a larger source of energy for conditioning a smaller battery of the hearing aid type. In this patent, small contacts are provided for connecting one battery to another and become, in effect, a battery holder that is difficult to manipulate by the user.

In prior art devices such as those illustrated above, either a requirement for precision manufacturing, large number of parts to be assembled, difficulty in using and other factors to numerous to be noted, have resulted in a lack of general acceptance by the users of small batteries for prolonging the life of the small batteries by utilizing the conditioning process known as "depolarizing" and wide scale adoption of this process has not occurred.

My invention provides a conditioning device for small batteries that is inexpensive to fabricate, has few parts and therefore presents no service problems, and more importantly, is easy to use by individuals lacking manual dexterity for one reason or another. As will be described in greater detail below, my battery rejuvenator consists of a hollow cylindrical casing having a removable cap and a holder for small batteries, of various sizes, that is contained within the housing when the removable top is in a locked position. The flow of the conditioning or depolarizing current from a large battery contained within the housing to a small battery is initiated immediately and automatically as the unit is assembled. The user needs to do nothing except to allow the battery sufficient time to become conditioned or polarized and after the passage of a suitable amount of time, the cover is removed, the battery is removed from the holder and may be reinserted for further service in the instrument in which is utilized. In one sense, the operation of my small battery rejuvenator is automatic in that the large battery contained therein is connected to the small battery to be depolarized in such a manner that a current will continue to flow until the depolarization has been accomplished at which point the voltages of the small and large batteries will be the same and the current will no longer flow so that there is no hazard associated with unattended operation. The user will typically become accustomed to the length of time it may take for a battery to become polarized and may thereafter remove a small battery from an electronic instrument and place the same in my device for depolarization at predetermined time intervals.

DESCRIPTION OF THE INVENTION

Figure 1:
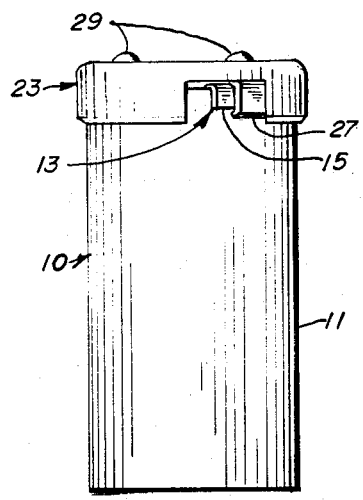
FIG. 1 is a side elevational view of my device in assembled form.
Figure 3:
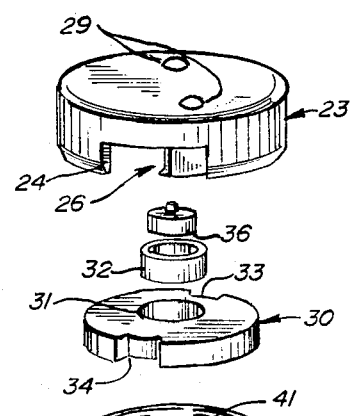
FIG. 3 is a bottom view of the apparatus shown in FIGS. 1 and 2.
Figure 3:
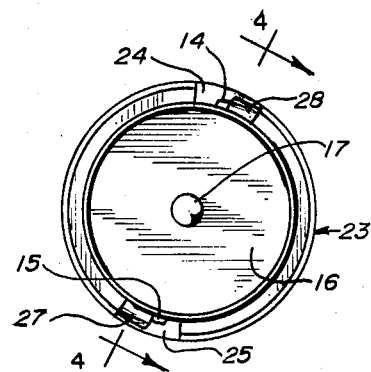

Referring to all of the Figures of the drawing, my device is indicated generally by the reference character 10, which, when assembled as in FIG. 1 presents an attractive cylinder and may be comprised of suitable instulating material selected, for example, from available plastic compositions.

Battery conditioner 10 is comprised of an open ended cylindrically shaped lower housing 11 and a similarly shaped cover 23. As will be seen, base 11 and cover 23 are configured and dimensioned so that the open end of cover 23 may be slidably disposed on the outer periphery of the open end of base 11. Base 11 has an open ended top portion 12 and contains a U-shaped conductive contact 13 having ends 14 and 15 bent over the top and top outer periphery of case 11 and further includes a closed bottom portion 16. U-shaped contact 13 is held in place on bottom portion 16 through the use of a rivet, or the like, 17. A spring 18 is shown mounted on ears 19 and 20 extending upwardly from the bottom portion of U-shaped contact 13. The interior dimensions of base 11 and the thickness of U-shaped contact 13 are such that a larger battery, 40 having a lower electrode 42 and an upper electrode 41 disposed at the center thereof, may slidably be received therein and, as may be explained in greater detail below, spring 18 exerts a biasing force tending to move battery 40 to engagement with one of the terminals of a battery to be charged while maintaining electrical contact with spring 18 on U-shaped contact 13.

Cover 23 has a pair of opposed side slots 24 and 25 and is similarly provided with a U-shaped contact 26 that culminates in bent over portions 27 and 28 at each of the lower ends. U-shaped contact 26 is mounted on the underside of the top of cover 23 by the use of suitable rivets, or the like, 29.

Figure 4:
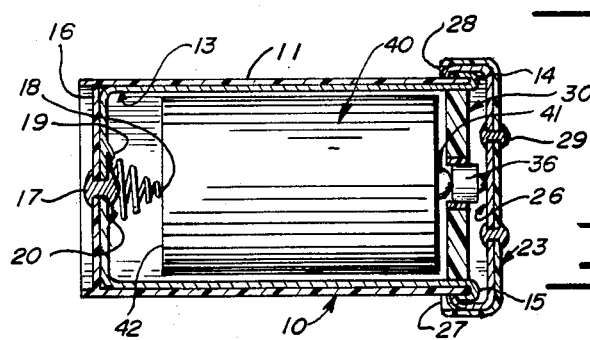
FIG. 4 is a sectional view taken along section line 4—4 in FIG. 3 of the drawing.

A battery holder for small batteries to be conditioned is indicated generally by reference character 30 and includes a central hole or aperture 31, a removable bushing 32 and a pair of opposed side slots 33 and 34 adapted to engage and be slidably received on the upper leg portions 14 and 15 of U-shaped contact 13 when in operative disposition as indicated on FIG. 4 of the drawing. Battery holder 30 and cover 23 may be comprised of suitable insulating material selected from available plastic compounds.

Figure 2:
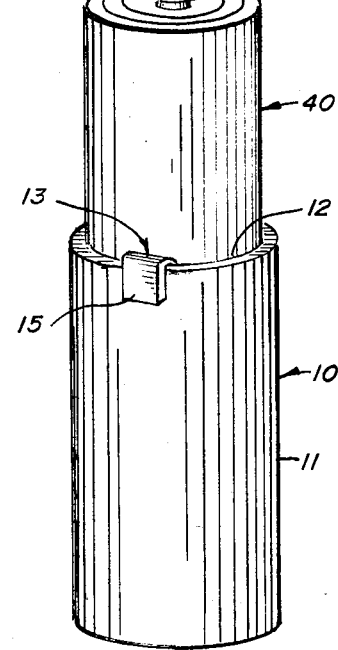
FIG. 2 is an exploded view of the various elements of my device.

As shown on FIG. 2 and 4 of the drawings, a small battery 36 may be slidably, frictionally received in battery holder 30 as in aperture 31 or within bushing 32 when inserted in aperture 31.

It may now be appreciated that when the battery conditioner of my invention is in an active or assembled state as indicated in FIG. 4, cover 23 is maintained disposed on the open end of base 11 through the conjoint action of the bent ends 14 and 15 of U-shaped conductor 13 and the inwardly bent ears 27 and 28 disposed on the ends 27 and 28 of contact 26 which serves to retain cover 23 in releasable locked disposition thereon. The conjoint operation is simple, facile and positive in operation. Further, battery 36 is maintained with its upper end in contact with U-shaped contact 26 in cover 23 and battery 40 is maintained with its upper contact 41 in contact with the lower contact on batter 36 through the operation of spring 13. It may be seen that battery holder 30 is free to move along the length of the side portions of U-shaped contact 13 and, in any event, suitable contact is maintained to permit the flow of current during the conditioning cycle.

OPERATION

When a user of small batteries determines that a conditioning operation is desirable, or at predetermined intervals in the life of a battery, cover 23 is removed by twisting the same and by disengaging ears 27 and 28 from the ends 14 and 15 of U-shaped contact 13 and sliding cover 23 off to open the container. Battery holder 30 is removed and a battery, 36, to be conditioned, is slidably, frictionally disposed at the center most location. A suitable source of power, a battery 40, is disposed within case 10 on top of spring 18, battery holder 30 containing battery 36 is slidably disposed on the legs of U-shaped contact 13 and cover 23 is disposed with the openings in slots 24 and 25 in alignment of ends 14 and 15 of U-shaped contact 13. Cover 23 is pushed onto the end of base 11 against the biasing force from spring 18 and is then twisted so that the bend ends 27 and 28 of contact 26 are disposed over the ends 14 and 15 of U-shaped contact 13 to provide a locking, conductive engagement therebetween. Battery 36 and battery 40 are disposed so that the positive terminals and the negative thereof are in current conducting engagement.

A typical hearing aid battery may require a conditioning time of about two hours so that the assembled conditioner may simply be placed to one side and, since the conditioning action associated with depolarization of battery 36 is, in a sense, automatic, the cycle will be completed during the conditioning portion of the cycle.

The conditioned battery 36 is then removed by twisting cover 23 and sliding it off of the end of case 11 and removing battery 36 from battery holder 30.

I claim:

1. A conditioner for depolarizing miniature batteries comprising in combination;
   a hollow cylindrical housing having an open upper end and comprised of insulating material for receiving a storage battery source of current;
   first electrical contact means of conductive material extending over the sides of said housing at the open upper end thereof forming a catch and interiorly extending to the bottom of said housing and including conductive spring biasing means to engage one end of said storage battery;
   carrier means comprised of insulating material for receiving a miniature battery to be depolarized, said means dimensioned to be slidably received in the open end of said housing and including a central aperture for receiving said battery to be depolarized; and
   cover means comprised of insulating material and having an open lower end, dimensioned to be slidably received over the open end of said housing and, including second electrical contact means extending thereacross for engagement with said miniature battery to be depolarized at its center, said second means including a latch adapted to conductively, latchably engage the catch of the first contact means in said housing.

2. The subject matter of claim 1 in which the carrier means includes means for slidably, non-rotatably engaging the top ends of the first electrical contact means in the hollow cylindrical housing.

3. The subject matter of claim 1 in which the cover means includes a pair of opposed side slots and the second electrical contact means extends downwardly therein.

4. The subject matter of claim 3 in which the ends of the second contact means in the cover extend inwardly.

5. A conditioner for depolarizing miniature batteries comprising in combination;
   a hollow cylindrical housing having one open end comprised of insulating material and shaped to receive and hold a cylindrical battery source;
   carrier means dimensioned to overlie the end of said battery, said carrier means comprised of insulating material, including a centrally disposed aperture, said aperture being shaped to receive and retain a miniature battery to be depolarized in polaric relationship to said cylindrical battery and said carrier being configured to position said miniature battery to be depolarized in conductive relationship with one end of said cylindrical battery; and
   conductive latching means connected to the other end of said battery within said housing, extending outwardly from the open end of said housing and including means for conductively engaging the other end of said miniature battery to be depolarized and retaining said carrier and said miniature battery to be depolarized in operative conductive disposition on the other end of said battery.

6. The subject matter of claim 5 in which the conductive latching means includes a cylindrical shaped cover to be slidably received on the open end of the hollow housing.

7. The subject matter of claim 6 in which the carrier means is dimensioned to be slidably received within the open end of the housing and conductive spring biasing means are associated in axial alignment therewith.

8. A conditioner for depolarizing miniature batteries comprising in combination;

- a hollow cylindrical housing having an open upper end and comprised of insulating material for receiving a storage battery source of current;
- conductive catch means extending over the side of said housing at the open upper end thereof forming a catch and interiorly extending to the bottom of said housing including conductive spring biasing means to engage one end of said storage battery;
- carrier means comprised of insulating material for receiving a miniature battery to be depolarized, said means dimensioned to be slidably received in the open end of said housing and including a central aperture for receiving said miniature battery to be depolarized; and
- conductive latch means extending across the open upper end of the housing for conductive engagement with said miniature battery to be depolarized and being adapted to connectably engage the catch means to releasably hold the storage battery source and the carrier means within the housing in an operable conductive disposition.

* * * * *